United States Patent
Grewal (10) Patent No.: US 8,763,047 B2
(45) Date of Patent: Jun. 24, 2014

(54) METHODS AND SYSTEMS FOR VIDEO CONTENT DELIVERY

(76) Inventor: Sukhminder Singh Grewal, New Haven, CT (US)

(*) Notice: Subject to any disclaimer, the term of this patent is extended or adjusted under 35 U.S.C. 154(b) by 0 days.

(21) Appl. No.: 13/427,671

(22) Filed: Mar. 22, 2012

(65) Prior Publication Data
US 2012/0246691 A1    Sep. 27, 2012

Related U.S. Application Data (60) Provisional application No. 61/466,282, filed on Mar. 22, 2011.

(51) Int. Cl.
G06F 13/00    (2006.01)

(52) U.S. Cl.
USPC .............................. 725/51; 725/25

(58) Field of Classification Search
USPC .................................. 725/34–61, 95
See application file for complete search history.

(56) References Cited

U.S. PATENT DOCUMENTS

| | | | |
|---|---|---|---|
| 5,926,207 A | 7/1999 | Vaughan et al. | |
| 6,025,837 A | 2/2000 | Matthews, III et al. | |
| 6,133,910 A * | 10/2000 | Stinebruner | 725/49 |
| 6,169,541 B1 * | 1/2001 | Smith | 715/716 |
| 6,195,692 B1 | 2/2001 | Hsu | |
| 6,326,982 B1 | 12/2001 | Wu et al. | |
| 6,349,410 B1 * | 2/2002 | Lortz | 725/110 |
| 6,381,748 B1 * | 4/2002 | Lin et al. | 725/109 |
| 6,481,010 B2 | 11/2002 | Nishikawa et al. | |
| 6,587,873 B1 * | 7/2003 | Nobakht et al. | 709/219 |
| 6,631,523 B1 | 10/2003 | Matthews, III et al. | |
| 6,745,223 B1 | 6/2004 | Nobakht et al. | |
| 6,785,716 B1 | 8/2004 | Nobakht | |
| 6,813,639 B2 | 11/2004 | Nobakht et al. | |
| 7,152,236 B1 * | 12/2006 | Wugofski et al. | 725/40 |
| 7,409,140 B2 | 8/2008 | Rodriguez et al. | |
| 7,434,246 B2 | 10/2008 | Florence | |
| 7,506,066 B2 | 3/2009 | Nobakht et al. | |
| 8,375,080 B2 * | 2/2013 | Kim et al. | 709/203 |
| 2002/0042915 A1 * | 4/2002 | Kubischta et al. | 725/38 |
| 2002/0144288 A1 * | 10/2002 | Kitsukawa | 725/112 |
| 2002/0157098 A1 * | 10/2002 | Zustak et al. | 725/51 |
| 2002/0188952 A1 * | 12/2002 | Istvan et al. | 725/95 |
| 2006/0235960 A1 * | 10/2006 | Lai et al. | 709/224 |
| 2007/0050708 A1 * | 3/2007 | Gupta et al. | 715/513 |
| 2009/0193465 A1 | 7/2009 | Yi | |
| 2009/0217323 A1 | 8/2009 | Yi | |

* cited by examiner

Primary Examiner — Pankaj Kumar
Assistant Examiner — Timothy Newlin
(74) Attorney, Agent, or Firm — Armstrong Teasdale LLP (57) ABSTRACT

A set top box computer system for delivering video content is provided. The set top box computer system includes a memory device configured to store channel information including a channel identifier and a video source for each of a plurality of video content channels, a user input interface configured to receive a channel selection, and a processor coupled to the memory device and the user input interface, the processor configured to acquire video content based on a comparison of the channel information and the channel selection, the video content acquired from a corresponding video source located on the Internet, the processor further configured to transmit the video content to a media display device such that the transmitted video content is displayed on the media display device without displaying other content from the corresponding video source.

21 Claims, 4 Drawing Sheets

METHODS AND SYSTEMS FOR VIDEO CONTENT DELIVERY

CROSS-REFERENCE TO RELATED APPLICATIONS

This application claims priority to U.S. Provisional Application No. 61/466,282 filed Mar. 22, 2011, the entire disclosure of which is hereby incorporated by reference in its entirety.

BACKGROUND OF THE INVENTION

This invention relates generally to media content delivery systems and more particularly, to displaying Internet video content on a television.

The Internet provides a wide variety of video content. Using a suitable computing device connected to the Internet, such as a personal computer, users can access this video content through an Internet browser by using search engines, browsing websites, and streaming and/or downloading desired video content. However, not all users may be able to quickly and easily access and locate Internet video content using an Internet browser and/or a personal computer. For example, several users may not be trained or experienced in using an Internet browser, but these same users may still want to access video content that is available on the Internet.

At least some known content delivery systems allow users to access and display websites on a television. However, in at least some known content delivery systems, although the websites are displayed on a television, users must still navigate the websites and use search engines to access desired video content. Accordingly, while at least some known content delivery systems display Internet websites on a television, these systems still require that users have the knowledge, skill, and expertise to effectively use an Internet browser, navigate a menu system, and/or utilize a search engine.

BRIEF DESCRIPTION OF THE INVENTION

In one aspect, a set top box computer system for delivering video content is provided. The set top box computer system includes a memory device configured to store channel information including a channel identifier and a video source for each of a plurality of video content channels, a user input interface configured to receive a channel selection, and a processor coupled to the memory device and the user input interface. The processor is configured to acquire video content based on a comparison of the channel information and the channel selection. The video content is acquired from a corresponding video source located on the Internet. The processor is further configured to transmit the video content to a media display device such that the transmitted video content is displayed on the media display device without displaying other content from the corresponding video source.

In another aspect, a method of delivering video content is provided. The method includes receiving, at a set top box computer system, a channel selection, acquiring video content from a corresponding video source located on the Internet. The video content is acquired based on the received channel selection and transmitted to a media display device. The transmitted video content is displayed on the media display device without displaying other content from the corresponding video source.

In another aspect, a video content delivery system to deliver video content to a display device via a set top box computer is provided. The video content delivery system includes a memory device storing channel information including a channel identifier and a video source identifier for each of a plurality of video content channels to enable the set top box computer to acquire video content, a communication interface, and a processor communicatively coupled to the memory device and the interface device. The memory device includes instructions that, when executed by the processor, cause the processor to transmit the channel information to the set top box computer.

DETAILED DESCRIPTION OF THE INVENTION

The methods and systems for video content delivery described herein overcome the limitations of known content delivery systems. The methods and systems described herein include a set top box capable of acquiring video content from the Internet and displaying the acquired video content on a device, such as a television. The video content is displayed on the television while excluding other information included in the website hosting the video content, such as text, banners, advertisements, and/or still images. Further, for simple and efficient navigation between distinct video sources, the video content is organized in channels having predetermined video content. Moreover, the set top box may be operated using a remote control as an input device. Finally, the methods and systems described herein facilitate displaying Internet video content on a television without requiring that a user be able to use a web browser, an on-screen menu, and/or a search engine to locate desired video content.

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to media content delivery in commercial and residential applications. As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
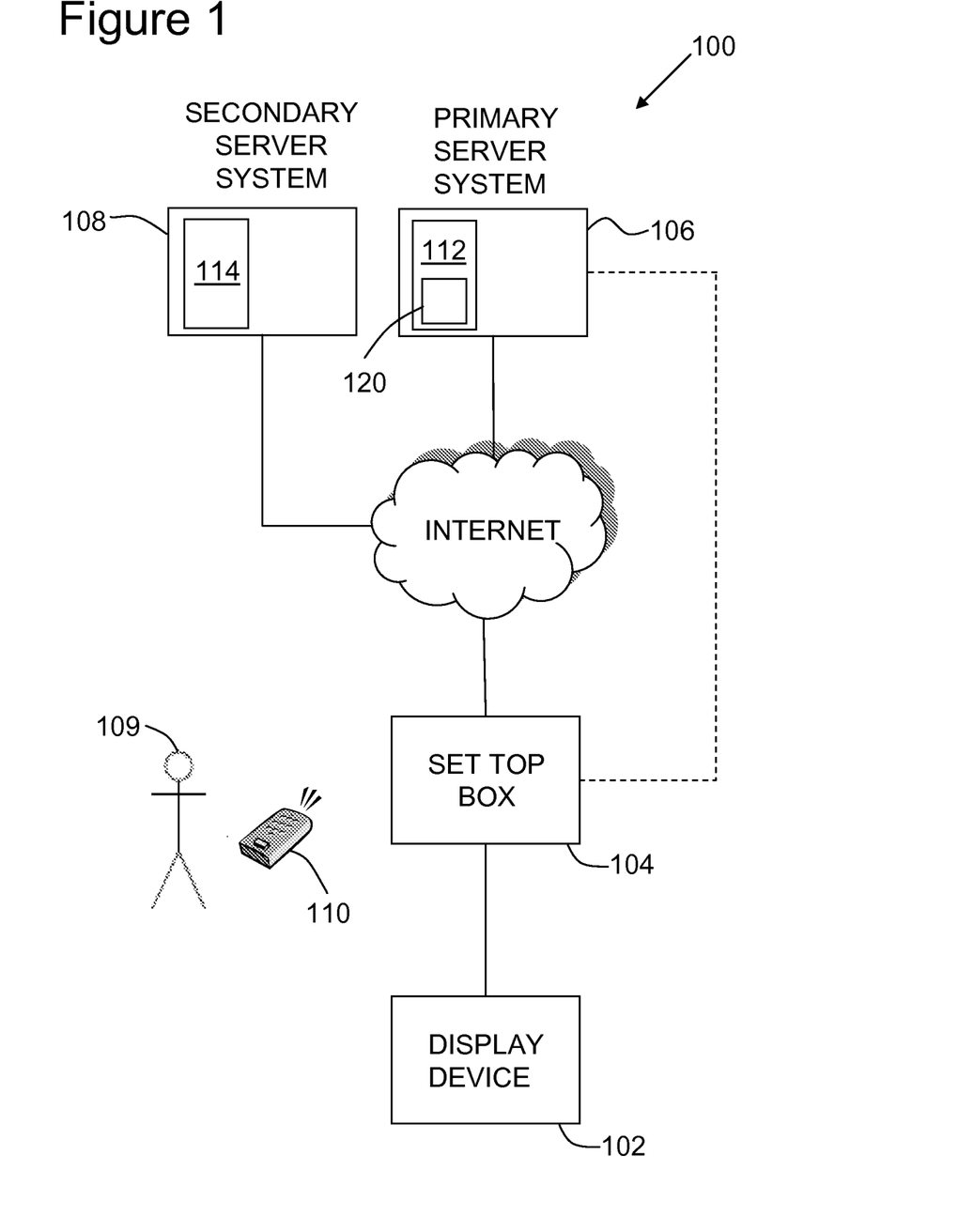
FIG. 1 is a simplified block diagram of an exemplary video content delivery system.

FIG. 1 is a simplified block diagram of an exemplary video content delivery system 100 that includes a media display device 102, a set top box 104, a primary server system 106, and a secondary server system 108. The set top box 104 is connected to the media display device 102. The media display device 102 may include, for example, a television, a monitor, a projector, a cathode ray tube (CRT), a liquid crystal display (LCD), an organic LED (OLED) display, an "electronic ink" display, and/or any other device capable of displaying video content as described herein. The set top box 104 may be connected to the media display device 102 through many interfaces including high-definition multimedia interface (HDMI), universal serial bus (USB), radio frequency (RF) coaxial cable, composite video, separate video (S-video), component video, and/or video graphics array (VGA). The set top box 104 transmits video content for display on the media display device 102, as described in detail below.

In the exemplary embodiment, the set top box 104, the primary server system 106, and the secondary server system 108 are connected to the Internet. The set top box 104, the primary server system 106, and the secondary sever system 108 may be connected to the Internet through many interfaces including a network, such as a local area network (LAN) or a wide area network (WAN), dial-in-connections, cable modems, and special high-speed Integrated Services Digital Network (ISDN) lines. In one embodiment, the set top box 104 is directly connected to the primary server system 106. The set top box 104 interacts with the primary server system 106 and the secondary server system 108, as described in detail below.

To operate the set top box 104, a user 109 operates a user input device 110. In the exemplary embodiment, the user input device 110 is a remote control, such as a television remote control. Alternatively, the user input device 110 may include a keyboard, a pointing device, a mouse, a stylus, a touch sensitive panel (e.g., a touch pad or a touch screen), a gyroscope, an accelerometer, a position detector, and/or an audio user input interface. By operating the user input device 110, the user 109 can select which video content to display on the media display device 102, as described in detail below. Further, in the exemplary embodiment, the set top box 104 is programmed to operate with user input devices 110 not designed specifically for use with the set top box 104, such as a universal remote control.

The video content delivery system 100 facilitates displaying video content on the media display device 102. As used herein, video content includes any video data that is accessible on the Internet, the primary server system 106, and/or the secondary server system 108, such as, for example, video clips, video blogs, streaming video, and/or live video. Using the video content delivery system 100, the video content displayed on the media display device 102 is displayed in a full screen format. That is, video content on the Internet is typically embedded within a webpage, with the video content only displayed on a portion of the webpage. The remaining space of the webpage may be occupied by advertisements, banners, text, still images, etc. However, using the video content delivery system 100, when the video content is displayed on the media display device 102, only the video content is displayed. The remaining website content (e.g., advertisements, banners, text, still images, etc.) is not displayed on the media display device 102, unless the remaining website content is incorporated into the video content.

While the set top box 104 displays the video content in a format that excludes other content, in the exemplary embodiment, the actual video content may be unchanged from the video content available on the Internet, the primary server system 106, and/or the secondary server system 108. For example, if a given segment of video content includes advertisements and/or promotions between clips, those advertisements and promotions are also included when the video content is displayed on the media display device 102. That is, advertisements and other content that is included by a creator and/or host of the video content may be included in the video content displayed on the media display device. In some embodiments, the video content available on the Internet, the primary server system 106, and/or the secondary server system 108 has a finite length. Accordingly, in some embodiments, when the video content displayed on the media display device 102 reaches the end of the clip and/or segment, the video content loops, starting from the beginning again.

In the exemplary embodiment, the video content is organized into one or more channels. Each channel is associated with a video source on the Internet, the primary server system 106, and/or the secondary server system 108. For example, many television stations display streaming video content on their websites. Accordingly, in one example, a first range of channels is associated with a variety of streaming news video content from select television station websites, and a second range of channels is associated with a variety of streaming weather video content from select television station websites. In another example, at least one channel includes episodes of a single show or a select group of shows. In another example, at least one channel includes content predetermined by a media content provider, such as, for example, Netflix®. (Netflix is a registered trademark of NetFlix.com, Inc., Los Gatos, Calif.). In another example, premium television channel providers, such as, for example, HBO®, may provide one or more video content channels accessible using the video content delivery system 100. (HBO is a registered trademark of Home Box Office, Inc., New York, N.Y.).

The exemplary channels described herein may be offered to the user 109 individually or grouped in one or more bundles having an associated pricing model. Further, video content providers, such as Netflix® and HBO®, may deal directly with the user 109, or may use an intermediary that offers subscriptions to the user 109. Notably, the intermediary need not be a local cable provider for video content delivery system 100 to function as described herein.

While the above examples discuss channels associated with a variety of video sources, these examples are not intended to be limiting. Those of ordinary skill in the art will understand that video sources may include any video source that provides video content that can be used with the video content delivery system 100 described herein. Further, video sources may or may not be specifically designed to provide video content to video content delivery system 100.

In one embodiment, at least one "dynamic channel" is included within the range of channels accessible though the set top box 104. The "dynamic channel" includes video content from a plurality of channels, and displays a particular channel at a particular time, according to a predetermined schedule. For example, the dynamic channel may display a first video content channel from 6 pm to 6:30 pm and then switch to displaying a second video content channel from 6:30 pm to 7 pm. The schedule that the dynamic channel follows may be determined by the user 109 and/or be programmed onto the set top box 104.

Each channel of video content has an associated channel identifier. In the exemplary embodiment, channel identifiers are numbers, similar to television stations. Alternatively, the channels may be organized using any suitable identifier including letters, numbers, and/or symbols. In some embodiments, the channel identifier may include information related to the specific video content available on that channel. For example, all channels beginning with "0 0 203" may include video content from websites of local television stations located in telephone area code 203. Similarly, postal codes, country codes, state abbreviations, and/or any other indicia may be included within channel identifiers. In the exemplary embodiment, the channel identifiers are identical for all users. Alternatively, the same video content may have different channel identifiers for different users.

To display video content on the media display device 102, the user 109 inputs a desired channel identifier using the user input device 110. Accordingly, to access the video content, the user 109 does not need to use a complicated interface, navigate a complex program guide, use an Internet browser, and/or use a search engine.

In the exemplary embodiment, the user 109 does not decide when a particular segment of video content begins. That is, video content delivery system 100 is not an on-demand system. Instead, each channel includes predetermined video content. Thus, although the video content is acquired from video sources on the Internet, the primary server system 106, and/or the secondary server system 108, the user 109 accesses video content that is already in progress, similar to media displayed on typical television channels. Alternatively, the user 109 may be able to navigate the video content by, for example, pausing, playing, stopping, fast forwarding, rewinding, slowing, jumping to the beginning, and/or jumping to the end of the video content, and the user input device 110 may include buttons for activating these functions.

The primary server system 106 and the secondary server system 108 include a first database 112 and a second database 114, respectively. The first database 112 and second database 114 may include any collection of data including hierarchical databases, relational databases, flat file databases, object-relational databases, object oriented databases, and any other structured collection of records or data that enables video content delivery system 100 to function as described herein. In the exemplary embodiment, the first database 112 is stored on the primary server system 106 and the second database 114 is stored on the secondary server system 108. In an alternative embodiment, the first database 112 and/or the second database 114 are stored remotely from the primary server system 106 and secondary server system 108. First database 112 and second database 114 may each include a single database having separated sections or partitions or may include multiple databases separate from one other. The data stored in the first database 112 and the second database 114 can be accessed by the user 109 operating the set top box 104, as described in detail below.

In the exemplary embodiment, channel information is stored on the first database 112. Further, video content is stored on the first database 112 of the primary server system 106 and/or on the second database 114 of the secondary server system 108. While only two server systems are shown in FIG. 1, video content may be stored on any number of servers that are connected to the Internet.

In the exemplary embodiment, the first database 112 stores a master channel list 120 that includes a list of all available channels including the channel identifier and the video source associated with each channel. The video source identifies where video content can be accessed on the Internet, the primary server system 106, and/or the secondary server system 108. The video source may include, for example, a uniform resource locator (URL) address of a website that hosts particular video content. The master channel list 120 may be programmed into the first database 112 and/or may be populated by the primary server system 106 communicating with the secondary server system 108 and/or the Internet. The master channel list 120 enables the set top box 104 to acquire video content from the Internet, the primary server system 106 and/or the secondary server system 108, as described in detail below.

Figure 2:
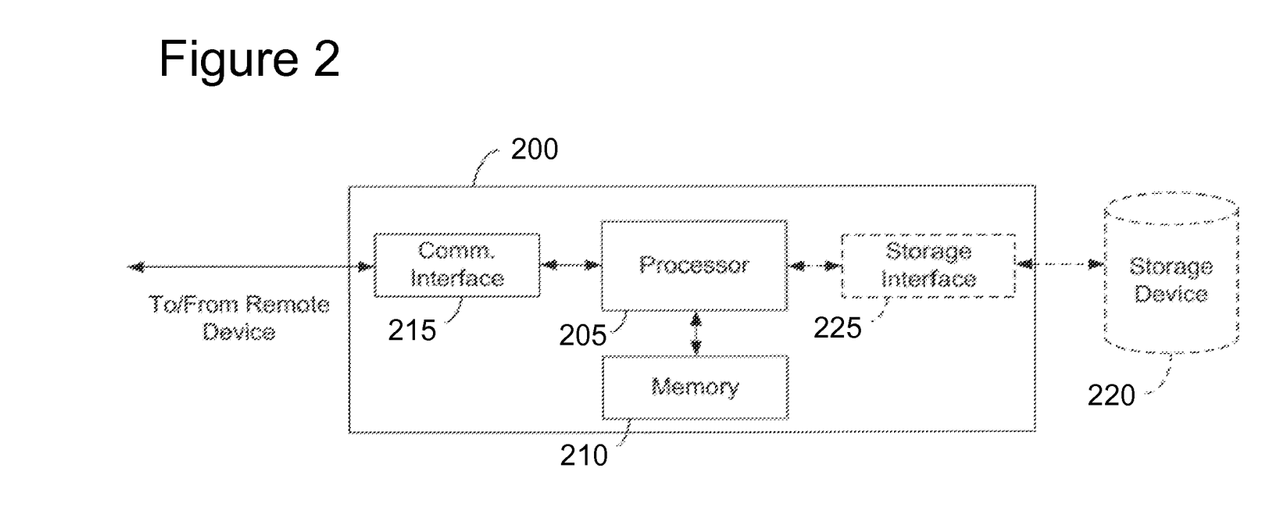
FIG. 2 illustrates an exemplary configuration of a server system shown in FIG. 1.

FIG. 2 illustrates an exemplary configuration of a server computing device 200 such as primary server system 106 and/or secondary server system 108 (shown in FIG. 1). The server computing device 200 may include, but is not limited to, a database server, an application server, a web server, a fax server, a directory server, and/or a mail server. The server computing device 200 also includes a processor 205 for executing instructions. Instructions may be stored in a memory area 210, for example. The processor 205 may include one or more processing units, for example, a multi-core configuration. In the exemplary embodiment, the processor 205 is operatively coupled to a communication interface 215 such that the server computing device 200 is capable of communicating with a remote device such as the set top box 104 or another server computing device 200. The communication interface 215 may include, for example, a wired or wireless network adapter or a wireless data transceiver for use with a mobile phone network, Global System for Mobile communications (GSM), 3G, or other mobile data network or Worldwide Interoperability for Microwave Access (WIMAX). For example, communication interface 215 may receive requests for channel information and/or video content from the set top box 104 via the Internet.

The processor 205 may also be operatively coupled to a storage device 220. The storage device 220 is any computer-operated hardware suitable for storing and/or retrieving data. In some embodiments, the storage device 220 is integrated in the server computing device 200. For example, the server computing device 200 may include one or more hard disk drives as the storage device 220. In other embodiments, the storage device 220 is external to the server computing device 200 and may be accessed by a plurality of server computing devices 200. For example, the storage device 220 may include multiple storage units such as hard disks or solid state disks in a redundant array of inexpensive disks (RAID) configuration. The storage device 220 may include a storage area network (SAN) and/or a network attached storage (NAS) system.

In some embodiments, the processor 205 is operatively coupled to the storage device 220 via a storage interface 225. The storage interface 225 is any component capable of providing the processor 205 with access to the storage device 220. The storage interface 225 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 205 with access to the storage device 220. A software application may operate at least in part by exchanging data, such as requests and responses, between the set top box 104 and the server computing device 200. For example, a software component executed by the set top box 104 may request data stored in the storage device 220, such as channel information and/or video content through the server computing device 200.

Figure 3:
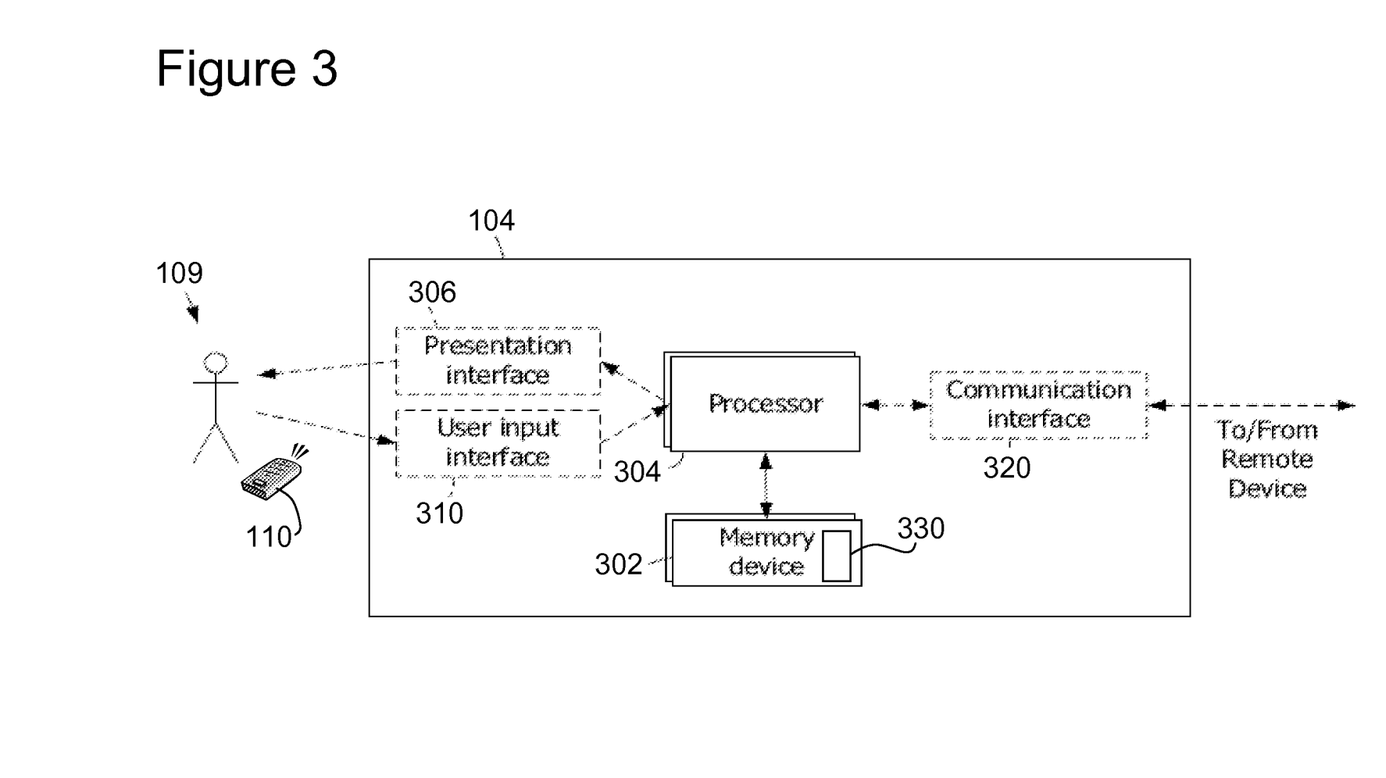
FIG. 3 illustrates an exemplary configuration of a set top box shown in FIG. 1.

FIG. 3 illustrates an exemplary configuration of the set top box 104. In the exemplary embodiment, the set top box 104 is separate from the other components of the video content delivery system 100. In an alternative embodiment, the set top box 104 may be included within at least one other component of the video content delivery system 100, such as the media display device 102.

In the exemplary embodiment, the set top box 104 includes a memory device 302 and a processor 304 coupled to the memory device 302 for executing instructions. In some embodiments, executable instructions are stored in the memory device 302. The set top box 104 is configured to perform one or more operations described herein by programming the processor 304. For example, the processor 304 may be programmed by encoding an operation as one or more executable instructions and storing the executable instructions in memory device 302 and/or retrieving the executable instructions from the memory device 302. In one embodiment, the processor 304 may include one or more processing units (e.g., in a multi-core configuration).

The memory device 302 is one or more devices that enable information, such as executable instructions and/or other data, to be stored and retrieved. The memory device 302 may include one or more computer readable media, such as, without limitation, dynamic random access memory (DRAM), static random access memory (SRAM), a solid state disk, a hard disk, and/or any suitable memory that enables the processor 304 to store, retrieve, and/or execute instructions and/or data. The memory device 302 may be configured to store, without limitation, application source code, application object code, source code portions of interest, object code portions of interest, configuration data, execution events and/or any other type of data.

In the exemplary embodiment, the set top box 104 includes a presentation interface 306 that is coupled to the processor 304. The presentation interface 306 presents information, such as application source code and/or execution events, to the user 109. For example, the presentation interface 306 may include a display adapter that may be coupled to a display device, such as the media display device 102 (shown in FIG. 1).

Moreover, in the exemplary embodiment, the set top box 104 includes a user input interface 310. In the exemplary embodiment, the user input interface 310 is coupled to the processor 304 and receives input from the user 109. The user input interface 310 may include, for example, an infrared sensor, a radio sensor, and/or any device that enables the user 109 to control operation of the set top box 104 by operating the user input device 110.

In the exemplary embodiment, the set top box 104 includes at least one communication interface 320. The communication interface 320 is coupled to the processor 304 and is configured to be coupled in communication with one or more remote devices and/or networks, such as the media display device 102, the primary server system 106, and the secondary server system 108. The communication interface 320 may include, for example, a wired or wireless network adapter or a wireless data transceiver for use with a mobile phone network, Global System for Mobile communications (GSM), 3G, or other mobile data network or Worldwide Interoperability for Microwave Access (WIMAX). The communication interface 320 transmits data to, and/or receives data from, one or more remote devices and/or networks, such as the media display device 102, the primary server system 106, and the secondary server system 108.

To acquire channel information, the set top box 104 communicates with the primary server system 106. More specifically, the primary server system 106 transmits at least a portion of the master channel list 120 to the set top box 104. The transmitted portion of the master channel list 120 is stored as a subscriber channel list 330 in the memory device 302. In some embodiments, the subscriber channel list 330 may include the entire master channel list 120. In other embodiments, the subscriber channel list 330 may include only a portion of the master channel list 120. The portion of the master channel list 120 that makes up the subscriber channel list 330 may be determined by a subscription of the particular user 109. For example, the user 109 may subscribe to an all-access subscription plan that allows access to all of the channels in the master channel list 120, or, alternatively, the user 109 may subscribe to a limited-access subscription plan that allows access to only a portion of the channels in the master channel list 120.

To select a desired video content channel, the user 109 inputs a channel selection into the user input device 110 to transmit the channel selection to the set top box 104. The processor 304 compares the received channel selection with the subscriber channel list 330 to determine what particular video source on the Internet, the primary server system 106, and/or the secondary server system 108 is associated with the selected channel. For example, the processor may determine the particular URL address associated with the selected channel. If the channel selection does not match a channel in the subscriber channel list 330, the processor 304 does not acquire video content from the Internet, the primary server system 106, and/or the secondary server system 108, and may notify the user 109 that the selected channel is not available.

If the channel selection does match a channel in the subscriber channel list 330, the processor 304 locates the corresponding video source on the Internet, the primary server system 106, and/or the secondary server system 108, and the processor 304 communicates with the Internet, the primary server system 106, and/or the secondary server system 108 to acquire video content from the corresponding video source. The processor 304 transmits the acquired video content to the media display device 102 such that the video content is displayed on the media display device 102. In one embodiment, the processor 304 converts the acquired video content to a different format before transmission to the media display device 302. Alternatively, the processor 304 acquires the video content from the Internet, the primary server system 106, and/or the secondary server system 108 and transmits it to the media display device 102 without converting the format of the video content. In the exemplary embodiment, the processor 304 transmits the video content to the media display device 102 in a format that enables the video content to be displayed in a full screen format on the media display device 102, as described above.

Figure 4:
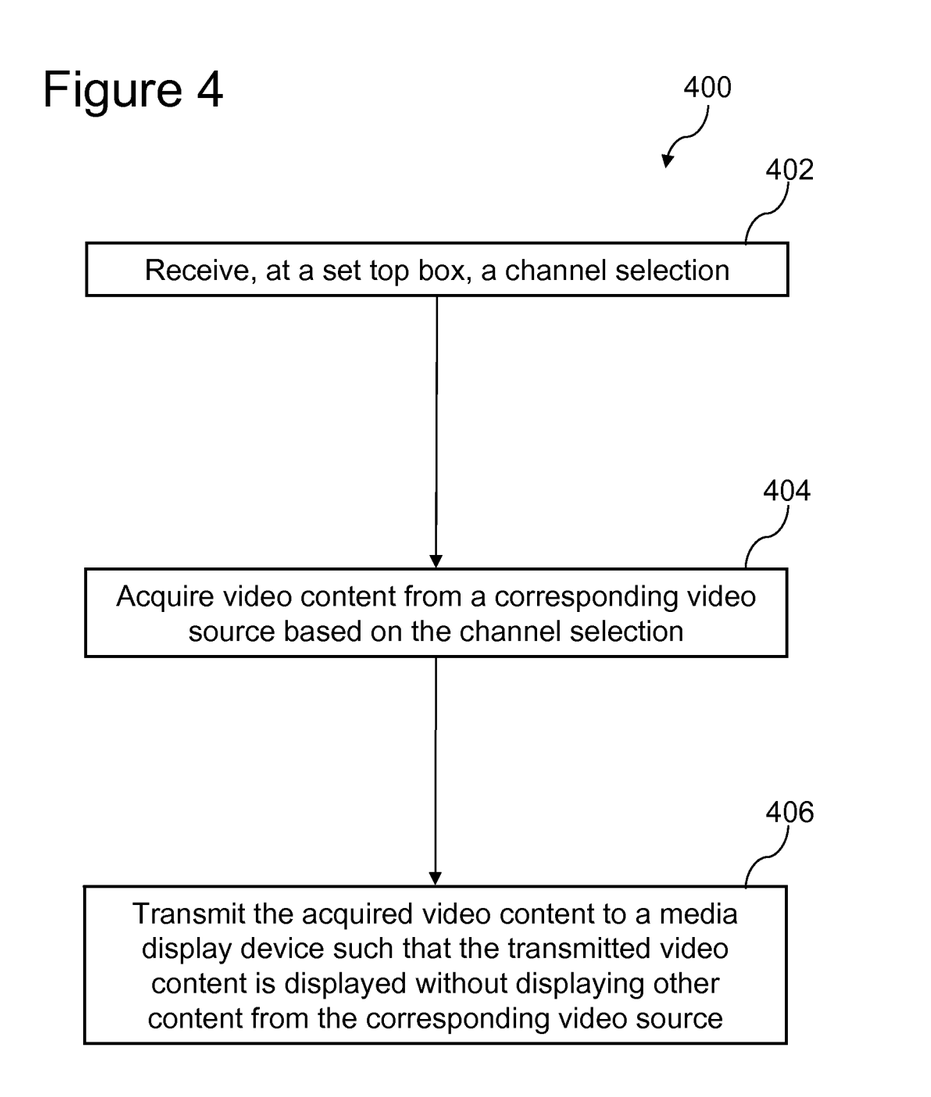
FIG. 4 is a flow diagram illustrating an exemplary method performed using the video content delivery system shown in FIG. 1.

FIG. 4 is a flow diagram illustrating an exemplary method 400 performed the video content delivery system 100 (shown in FIG. 1). Method 400 can be used when a user 109 (shown in FIGS. 1 and 3) wants to display video content on the media display device 102. The method 400 includes receiving 402, at the set top box 104 a channel selection. The user 109 may input the channel selection using the user input device 110. Based on the channel selection, the set top box 104 acquires 404 video content from a corresponding video source located on the Internet. For example, the set top box 104 may acquire 404 video content from the Internet, the primary server system 106, and/or the secondary server system 108. The corresponding video source may be determined by comparing the channel selection with the subscriber channel list 330. The set top box 104 transmits 406 the acquired video content to the media display device 102 such that the transmitted video content is displayed on the media display device without displaying other content from the corresponding video source.

The above-described methods and systems for video content delivery overcome the limitations of known content delivery systems. The methods and systems described herein include a set top box capable of acquiring video content from the Internet and displaying the acquired video content on a device, such as a television. The video content is displayed on the television while excluding other information included in the website hosting the video content, such as text, banners, advertisements, and/or still images. Further, for simple and efficient navigation between distinct video sources, the video content is organized in channels having predetermined video content. Moreover, the set top box may be operated using a remote control as an input device. Finally, the methods and systems described herein facilitate displaying Internet video content on a television without requiring that a user be able to use a web browser and/or search engine to locate desired video content.

The methods and systems described herein facilitate displaying Internet content on a media display device, such as a television. As compared to traditional television programming and television channels, the Internet offers a wide range of video content. Further, using the methods and systems described herein, video content can be acquired from video sources spread across the world, and the video content need not be associated with local television stations. Moreover, the methods and systems described herein enable video content providers to provide video content directly to users without requiring an intermediary, enabling video content providers to adapt video content, including advertisements, to specific users. Finally, using the methods and systems described herein, the video content is delivered in a channel format that many users are already comfortable and familiar with from experience using broadcast television and radio.

A technical effect of the systems and methods described herein includes at least one of: (a) receiving, at a set top box, a channel selection; (b) acquiring video content from a corresponding video source located on the Internet, wherein the video content is acquired based on the received channel selection; (c) and transmitting the acquired video content to a media display device, such that the transmitted video content is displayed on the media display device without displaying other content from the corresponding video source.

Exemplary embodiments of methods and systems for video content delivery are described above in detail. The methods and systems are not limited to the specific embodiments described herein, but rather, components of systems and/or steps of the methods may be utilized independently and separately from other components and/or steps described herein. For example, the methods may also be used in combination with other media delivery systems and methods, and are not limited to practice with only Internet video content as described herein. Rather, the exemplary embodiment can be implemented and utilized in connection with many other media storage and retrieval applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described in terms of various specific embodiments, those skilled in the art will recognize that the invention can be practiced with modification within the spirit and scope of the claims.

What is claimed is:

1. A set top box computer system for delivering video content, said system comprising:
    a memory device configured to store channel information including a channel identifier and a plurality of video sources for each video content channel of a plurality of video content channels;
    a user input interface configured to receive a channel selection; and
    a processor coupled to said memory device and said user input interface, said processor configured to acquire video content based on a comparison of the channel information and the channel selection, the video content acquired from a corresponding plurality of video sources located on the Internet, the processor further configured to automatically remove non-video content that would normally be displayed on a webpage from a video source and transmit the video content from the corresponding video source to a media display device to display the transmitted video content on the media display device as a single stream of video content without displaying the non-video content from the corresponding video source.

2. A set top box computer system in accordance with claim 1, wherein said user input interface is configured to receive the channel selection from a user input device, wherein said user input device is a remote control.

3. A set top box computer system in accordance with claim 1, wherein the video content is acquired from the plurality of video sources by a secondary server system and transmitted to said processor as the single stream of video content.

4. A set top box computer system in accordance with claim 1, wherein one or more video content channels includes a predetermined type of video content.

5. A set top box computer system in accordance with claim 1, wherein at least one video source comprises a television station website that includes streaming video content.

6. A set top box computer system in accordance with claim 1, wherein said set top box computer system is configured to communicate with a primary server system to generate the channel information stored in said memory device.

7. A set top box computer system in accordance with claim 1, wherein transmitting content without displaying other content includes excluding all non-video content from the single stream of video.

8. A method of delivering video content comprising:
    receiving, at a set top box computer system, a channel selection;

acquiring video content from a corresponding plurality of video sources located on the Internet, wherein the video content is acquired based on the received channel selection;

automatically removing non-video content that would normally be displayed on a webpage from a video source; and transmitting the acquired video content from the corresponding video source to a media display device, to display the transmitted video content as a single stream of video content on the media display device without displaying non-video content from the corresponding video source.

9. A method in accordance with claim 8, further comprising:

downloading, at the set top box computer system, channel information from a primary server system, the channel information including a channel identifier and a plurality of video sources for each video content channel of a plurality of video content channels.

10. A method in accordance with claim 9, wherein each video content channel of the plurality of video content channels includes predetermined video content from a plurality of video sources.

11. A method in accordance with claim 10, wherein at least one video source includes a television station website that includes streaming video.

12. A method in accordance with claim 9, further comprising comparing the channel selection with the channel information to determine the corresponding plurality of video sources from which to acquire the video content.

13. A method in accordance with claim 8, wherein acquiring video content comprises acquiring video content for the corresponding plurality of video sources by a secondary server system which transmits the single stream of video content to the set top box computer system.

14. A method in accordance with claim 8, wherein receiving a channel selection comprises receiving a channel selection from a remote control.

15. A video content delivery system to deliver video content to a display device via a set top box computer, said video content delivery system comprising:

a memory device storing channel information including a channel identifier and a plurality of video source identifiers for each video content channel of a plurality of video content channels to enable the set top box computer to acquire video content from a plurality of video sources for each video content channel;

a communication interface; and a processor communicatively coupled to said memory device and said interface device, said memory device including instructions that, when executed by said processor, cause said processor to:

transmit the channel information to the set top box computer;

acquire video content from a corresponding plurality of video sources located on the Internet by automatically removing non-video content that would normally be displayed on a webpage from a video source; and transmit the video content from the corresponding video source to a set top box computer to display the transmitted video content on a display device as a single stream of video content without displaying the non-video content from the corresponding video source.

16. A video content delivery system in accordance with claim 15, wherein the channel information comprises a master channel list, and wherein the instructions cause the processor to deliver a portion of the master channel list to the set top box computer.

17. A video content delivery system in accordance with claim 16, wherein the portion of the master channel list is determined based on a subscription of a user of the set top box computer.

18. A video content delivery system in accordance with claim 15, wherein said memory device, said communication interface, and said processor are part of a primary server system, wherein said memory device includes a first database, and wherein the channel information is stored in the first database 19. A video content delivery system in accordance with claim 18, wherein said memory device includes a first portion of the video content stored in the first database.

20. A video content delivery system in accordance with claim 19, wherein said video content delivery system comprises a secondary server system including a second database, and a second portion of the video content is stored in the second database.

21. A video content delivery system in accordance with claim 15, wherein a portion of the video content is located on the Internet, and the video source identifier identifies where the video content can be accessed on the internet.

* * * * *